(No Model.)
H. E. BRAUNFELD.
POWER TRANSMITTING MECHANISM FOR VELOCIPEDES.
No. 428,881. Patented May 27, 1890.
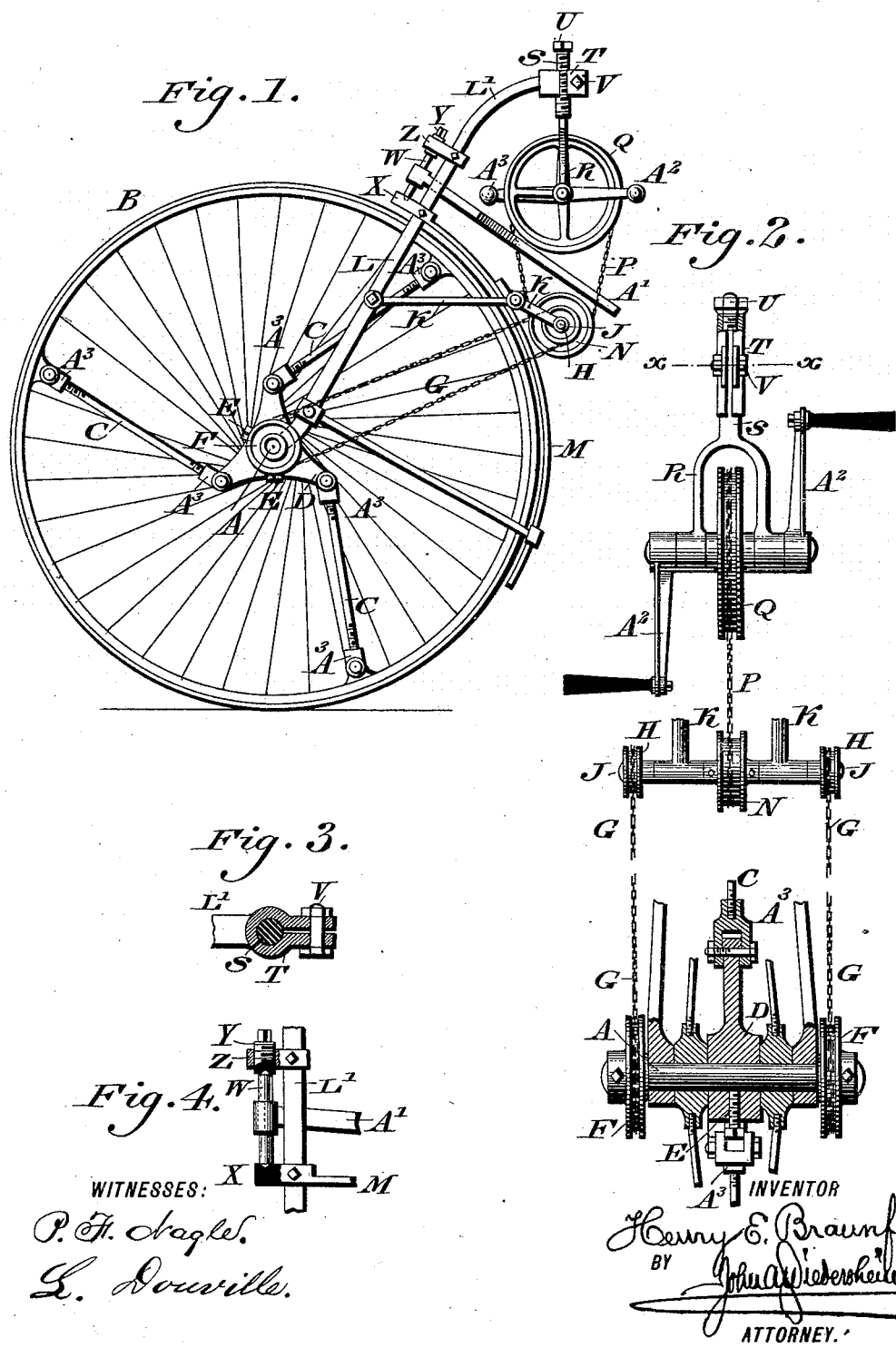

UNITED STATES PATENT OFFICE.

HENRY E. BRAUNFELD, OF ALLEGHENY, PENNSYLVANIA.

POWER-TRANSMITTING MECHANISM FOR VELOCIPEDES.

SPECIFICATION forming part of Letters Patent No. 428,881, dated May 27, 1890.

Application filed February 19, 1890. Serial No. 341,002. (No model.)

*To all whom it may concern:*

Be it known that I, HENRY E. BRAUNFELD, a citizen of the United States, residing in the city and county of Allegheny, State of Pennsylvania, have invented a new and useful Improvement in Mechanism for Transmitting Power, which improvement is fully set forth in the following specification and accompanying drawings.

My invention, broadly stated, consists of mechanism for transmitting motion or power from an axis, axle, or shaft to or near the rim of a wheel which is mounted on said axis, whereby the power is most effectively transmitted or conveyed to said wheel.

Figure 1 represents a side elevation of mechanism for transmitting power embodying my invention, the same being shown in connection with a bicycle. Fig. 2 represents a vertical section of a portion thereof on an enlarged scale. Fig. 3 represents a horizontal section of a portion thereof, on an enlarged scale, on line $x\,x$, Fig. 3. Fig. 4 represents a partial side elevation and partial vertical section of a detached portion.

Similar letters of reference indicate corresponding parts in the several figures.

Referring to the drawings, A designates a shaft or axle, on which is freely mounted a wheel B. At suitable points of the rim of the wheel are fixed the arms C, whose inner ends are secured to a winged hub or pulley D, which latter is firmly connected with the shaft or axle A by means of bolts E, it being noticed that the diameter of the wheel B is greater than that of the hub D. In the present case the hub D and arms C are located within the wheel B; but to this I do not limit myself, as said parts may be located outside of the wheel and duplicated on each side thereof, it being also noticed that there are three arms C, and consequently three places of connection for the same with the hub D; but it is evident that the number of said arms may be increased.

Secured to the shaft A are pulleys F, around which pass chains G, the latter also passing around pulleys H, which are keyed or otherwise secured to the shaft J, whose bearings are on the frame or arms K, connected with the fork L and guard M, said shaft J having secured to it a pulley N, around which passes a chain P, which also passes around a driving pulley or wheel Q, whose bearings are on a stirrup R, the upwardly-projecting stem S of which is screw-threaded and passes through a split sleeve T, said sleeve being connected with the upper part L' of the fork L.

The stem S is provided with a nut U, which bears upon the upper side of the sleeve T, and the latter is provided with a screw or bolt V, whereby provision is made for raising and lowering the wheel Q and also adjusting the tension of the chain P on the pulley N, the screw V serving to tighten the sleeve T, and thus hold the stem S in adjusted position and prevent rotation of said stem and consequently shifting of the driving-pulley Q.

W designates a pin or post, having its lower end resting in a step X, secured to the part L' of the fork, and its upper end fitted in a recess in the screw or bolt Y, connected with the boss Z, said boss Z and the step X being attached to the part L' of the fork, the guard M being also connected with said step X, it being noticed that the step X and screw Y form the bearings for the pin W, whereby the latter may rotate for steering purposes, it being noticed that the reach or backbone A' is formed with or otherwise secured to the pin W, said reach or backbone being forked, so as to clear the chain P, and connected with the rear portion of a bicycle or other vehicle, the rider being seated on the latter, so as to operate the cranks $A^2$ of the shaft of the driving-pulley Q.

It will be seen that when the cranks $A^2$ are rotated power is transmitted to the pulley Q, chain P, pulley N, pulleys H, chains G, and pulleys F, and consequently to the shaft A, from thence to the hub D, the arms C, and finally to the periphery of the wheel, where it is most effective, the wheel, as is evident, running freely on the axle.

The ends of the arms C are screw-threaded, and are connected with sockets $A^3$, which are pivotally attached, respectively, to the wings of the hub and the rim of the wheel, whereby provision is made for the adjustment of said arms and the tightening of the wheel, such adjustment and tightening being further effected by the tangential arrangement of said arms, it being evident that when the bolts E of the hub are loosened said hub may be rotated in order to move the arms C in the proper direction, after which the bolts are tightened and the parts retain their adjusted position.

It will be understood that the hub of the wheel moves freely around the axle, motion being imparted to the periphery or rim of said wheel through the arms C, which have a hub fixed to the said axle.

Having thus described my invention, what I claim as new, and desire to secure by Letters Patent, is—

1. In mechanism for transmitting power, the combination of a shaft or axle having a fixed hub and a loose wheel thereon, and means for connecting said hub with the loose wheel at the rim or periphery of the latter, substantially as described.

2. A hub fixed to a shaft or axle, and a wheel freely mounted on said shaft or axle, in combination with arms which are connected with the periphery of the hub and rim of the wheel, whereby the power of the shaft or axle is transmitted to said rim for rotating said wheel, substantially as described.

3. A shaft having a hub fixed thereto and a wheel freely mounted thereon, in combination with tangentially-arranged arms connected with said pulley and the rim of said wheel, substantially as described.

4. A wheel, in combination with the pulleys F, connected with the shaft thereof, the chains G, passing around said pulleys F and the pulleys H, said pulleys H and the pulley N being secured to the shaft J, whose bearings are on the arms K of the device, the chain P, passing around the pulley N and the pulley Q, the latter being supported on the part L' of the device, the shaft of said pulley Q having crank-arms for operating purposes, substantially as described.

5. In a device substantially as described, the driving-pulley Q, having the bearings of its shaft on the fork R, the latter being provided with a screw-stem S, which is fitted to the clamping-sleeve T, said stem being provided with a nut U, and said sleeve connected with the part L' of the device, as stated.

6. The part L' of the fork L of the wheel, having a step X, a threaded boss Z, and a screw Y, fitted in said boss, and the pin W of the reach or backbone A', having its bearings in said step and screw, substantially as described.

7. The wheel having a hub and rim and arms connected to sockets which are pivoted to said hub and rim, substantially as described.

HENRY E. BRAUNFELD.

Witnesses:
M. F. CASSIDY,
E. BIEDEL.